United States Patent
Clemens et al.

(10) Patent No.: US 11,284,618 B2
(45) Date of Patent: Mar. 29, 2022

(54) PESTICIDAL MIXTURES

(71) Applicant: SYNGENTA PARTICIPATIONS AG, Basel (CH)

(72) Inventors: Christopher Glen Clemens, Minneapolis, MN (US); Elijah Meck, Greensboro, NC (US)

(73) Assignee: SYNGENTA PARTICIPATIONS AG, Basel (CH)

( * ) Notice: Subject to any disclaimer, the term of this patent is extended or adjusted under 35 U.S.C. 154(b) by 0 days.

(21) Appl. No.: 16/335,598

(22) PCT Filed: Sep. 21, 2017

(86) PCT No.: PCT/EP2017/073872
§ 371 (c)(1),
(2) Date: Mar. 21, 2019

(87) PCT Pub. No.: WO2018/055022
PCT Pub. Date: Mar. 29, 2018

(65) Prior Publication Data
US 2019/0327973 A1 Oct. 31, 2019

Related U.S. Application Data

(60) Provisional application No. 62/397,989, filed on Sep. 22, 2016.

(51) Int. Cl.
*A01N 43/56* (2006.01)
*A01N 43/90* (2006.01)

(52) U.S. Cl.
CPC ............. *A01N 43/56* (2013.01); *A01N 43/90* (2013.01)

(58) Field of Classification Search
CPC ..... A01N 43/56; A01N 43/90; A01N 2300/00
See application file for complete search history.

(56) References Cited

FOREIGN PATENT DOCUMENTS

| CN | 102396475 A | 4/2012 |
|---|---|---|
| EP | 0501026 A1 | 9/1992 |
| WO | 2006068669 A1 | 6/2006 |
| WO | 2009138523 A2 | 11/2009 |
| WO | 2011033041 A2 | 3/2011 |

OTHER PUBLICATIONS

Machine translation for CN102396475 A; as provided by Espacenet; downloaded Sep. 11, 2019.*
Mustafa et al.; J. Econ. Entomol. 108(6): pp. 2529-2535; published Sep. 2, 2019 (see academic.oup.com/jee/article/108/6/2529/2379792).*
Xie et al.; J. Insect. Sci.; 14(261); pp. 1-7; published 2014; downloaded Sep. 11, 2019.*
Pavlista, Alexander; "In-furrow Versus Seed Applications of Systemic Insecticides for Potato Psyllid Control on Potato." Published 2002; downloaded May 13, 2020.*
"Potato"; (bioweb.uwlax.edu/bio203/s2009/bradley_adam/Growth.htm) published by Adam Bradley 2009; downloaded May 13, 2020.*
NPL search string (Google Scholar <2015); downloaded May 13, 2020.*
"Zebra Chip Management in the Pacific Northwest"; (www.syngenta-us.com/prodrender/imagehandler.ashx?ImID=134B5065-EEF3-4F80-93BO-FF95040803A1&fTy=0&et=8); two-page briefer published by Syngenta; copyrighted 2012; version Dec. 2012.*
Press Release: "Syngenta Registers Potato Insecticide/Fungicide Seed Treatment"; pp. 1-3 of 16 provided (pp. 4-16 advertisements omitted); published Nov. 6, 2013.*
Echegaray, E.R. et al.: "Potato Psyllid (Hemiptera: Triozidae) Response to Insecticides Under controlled Greenhouse Conditions", Journal of Economic Entomology, Dec. 27, 2016, page tow259.
Lacey, L.A. et al.: "Entomophathogenic fungi (Hypocreales) for control of potato psyllid, Bactericera cockerelli (Sulc) (Hemiptera: Triozidaed) in an area endemic for zebra chip desease of potato", Biological control, San Diego, CA, US, vol. 56, No. 32, Mar. 1, 2011, pp. 271-278.
International Search Report for PCT/EP2017/073872, dated Nov. 6, 2017.

* cited by examiner

*Primary Examiner* — Jeffrey T. Palenik
(74) *Attorney, Agent, or Firm* — Bakerhostetler; Toni-Junell Herbert

(57) ABSTRACT

A method of controlling potato psyllid in plant propagation materials comprising applying a composition comprising cyantraniliprole and abamectin to the plant propagation material.

4 Claims, No Drawings

PESTICIDAL MIXTURES

CROSS-REFERENCE TO RELATED APPLICATIONS

This application is a 371 National Stage application of International Application No. PCT/EP2017/073872, filed Sep. 21, 2017, which claims priority to U.S. Application No. 62/397,989 filed Sep. 22, 2016, the entire contents of which applications are hereby incorporated by reference.

FIELD OF TECHNOLOGY

The present technology relates to the use of compositions comprising a diamide insecticide and an avermectin. In particular, the present technology relates to the use of compositions comprising a diamide insecticide and an avermectin to combat certain pests.

BACKGROUND

Insects and related pests are commonly known to damage agricultural crops.

SUMMARY

By way of summary, the current disclosure is directed to, inter alia, a variety of methods, compositions, and propagation material. In one embodiment, the disclosure includes a method for controlling the potato psyllid by applying a composition comprising an avermectin and a diamide insecticide to propagation material.

The above summary was intended to summarize certain embodiments of the present disclosure. Systems, methods and compositions will be set forth in more detail, along with examples demonstrating efficacy, in the figures and detailed description below. It will be apparent, however, that the detailed description is not intended to limit the present invention, the scope of which should be properly determined by the appended claims.

DETAILED DESCRIPTION

In accordance with the present technology, compositions comprising a diamide insecticide and an avermectin may provide advantages in controlling specific pests on specific agricultural plants.

The compositions according to the invention can be used for controlling, i. e. containing or destroying, pests of the below mentioned type which occur in particular on plants, including on useful plants and ornamentals in agriculture, in horticulture and in forests, or on organs, such as fruits, flowers, foliage, stalks, tubers or roots, of such plants, and in some cases even plant organs which are formed at a later point in time remain protected against these pests.

The terms "diamide insecticide" refer to those molecules that share the same target site, the ryanodine receptor, and are grouped together under group 28, the ryanodine receptor modulator, of the Insecticide Resistance Action Committee (IRAC) mode of action classification. Suitable diamide insecticides include chlorantraniliprole, cyantraniliprole, flubendiamide, and cyclaniliprole.

The term "avermectin" refers to any of the members of the avermectin class of compounds, which are disclosed as milbemycins and avermectin for example, in U.S. Pat. Nos. 4,310,519; and 4,427,663. Avermectins are known to the person skilled in the art. They are a group of structurally closely related pesticidally active compounds that are obtained by fermentation of a strain of the microorganism *Streptomyces avermitilis*. Derivatives of avermectins can be obtained via conventional chemical syntheses. "Abamectin" is a mixture of avermectin $B_{1a}$ and avermectin $B_{1b}$ and is described, for example, in The Pesticide Manual, 10th Ed. (1994), The British Crop Protection Council, London, page 3. The designation "abamectin" and "avermectin" include derivatives. Acceptable avermectins useful in the invention include, for example, ivermectin, doramectin, selamectin, emamectin, and abamectin.

Compositions that included a diamide insecticide and an avermectin useful in the methods of the present invention include, but are not limited to, combinations of cyantraniliprole and abamectin, combinations of chlorantraniliprole and abamectin, combinations of cyantraniliprole and emamectin benzoate, combinations of chlorantraniliprole and emamectin benzoate, combinations of cyclaniliprole and abamectin, and combinations of cyclaniliprole and emamectin benzoate. In certain embodiments, combinations of cyantraniliprole and abamectin may be utilized. In additional embodiments, combinations of cyclaniliprole and abamectin may be utilized.

The insecticidal or acaricidal activity of the compositions of the present invention may manifest themselves directly, i. e. in destruction of the pests, which takes place either immediately or only after some time has elapsed, for example during ecdysis, or indirectly, for example in a reduced oviposition and/or hatching rate, a good activity corresponding to a destruction rate (mortality) of at least 50 to 60%.

Examples of pests to which compositions of the present invention may be useful in controlling may include:

from the order Acarina, for example, *Acalitus* spp, *Aculus* spp, *Acaricalus* spp, *Aceria* spp, *Acarus siro*, *Amblyomma* spp., *Argas* spp., *Boophilus* spp., *Brevipalpus* spp., *Bryobia* spp, *Calipitrimerus* spp., *Chorioptes* spp., *Dermanyssus gallinae*, *Dermatophagoides* spp, *Eotetranychus* spp, *Eriophyes* spp., *Hemitarsonemus* spp, *Hyalomma* spp., *Ixodes* spp., *Olygonychus* spp, *Ornithodoros* spp., *Polyphagotarsone latus*, *Panonychus* spp., *Phyllocoptruta oleivora*, *Phytonemus* spp, *Polyphagotarsonemus* spp, *Psoroptes* spp., *Rhipicephalus* spp., *Rhizoglyphus* spp., *Sarcoptes* spp., *Steneotarsonemus* spp, *Tarsonemus* spp. and *Tetranychus* Spp.;

from the order Anoplura, for example, *Haematopinus* spp., *Linognathus* spp., *Pediculus* spp., *Pemphigus* spp. and *Phylloxera* spp.;

from the order Coleoptera, for example, *Agriotes* spp., *Amphimallon majale*, *Anomala orientalis*, *Anthonomus* spp., *Aphodius* spp, *Astylus atromaculatus*, *Ataenius* spp, *Atomaria linearis*, *Chaetocnema tibialis*, *Cerotoma* spp, *Conoderus* spp, *Cosmopolites* spp., *Cotinis nitida*, *Curculio* spp., *Cyclocephala* spp, *Dermestes* spp., *Diabrotica* spp., *Diloboderus abderus*, *Epilachna* spp., *Eremnus* spp., *Heteronychus arator*, *Hypothenemus hampei*, *Lagria vilosa*, *Leptinotarsa decemLineata*, *Lissorhoptrus* spp., *Liogenys* spp, *Maecolaspis* spp, *Maladera castanea*, *Megascelis* spp, *Melighetes aeneus*, *Melolontha* spp., *Myochrous armatus*, *Orycaephilus* spp., *Otiorhynchus* spp., *Phyllophaga* spp, *Phlyctinus* spp., *Popillia* spp., *Psylliodes* spp., *Rhyssomatus aubtilis*, *Rhizopertha* spp., *Scarabeidae*, *Sitophilus* spp., *Sitotroga* spp., *Somaticus* spp, *Sphenophorus* spp, *Sternechus subsignatus*, *Tenebrio* spp., *Tribolium* spp. and *Trogoderma* spp.;

from the order Diptera, for example, *Aedes* spp., *Anopheles* spp, *Antherigona soccata*, *Bactrocea oleae*, *Bibio hortulanus*, *Bradysia* spp, *Calliphora erythrocephala*, *Ceratitis* spp., *Chrysomyia* spp., *Culex* spp., *Cuterebra* spp., *Dacus* spp., *Delia* spp, *Drosophila melanogaster, Fannia* spp., *Gastrophilus* spp., *Geomyza tripunctata, Glossina* spp., *Hypoderma* spp., *Hyppobosca* spp., *Liriomyza* spp., *Lucilia* spp., *Melanagromyza* spp., *Musca* spp., *Oestrus* spp., *Orseolia* spp., *Oscinella frit, Pegomyia hyoscyami, Phorbia* spp., *Rhagoletis* spp, *Rivelia quadrifasciata, Scatella* spp, *Sciara* spp., *Stomoxys* spp., *Tabanus* spp., *Tannia* spp. and *Tipula* spp.;

from the order Hemiptera, for example, *Acanthocoris scabrator, Acrosternum* spp, *Adelphocoris lineolatus, Amblypelta nitida, Bathycoelia thalassina, Blissus* spp, *Cimex* spp., *Clavigralla tomentosicollis, Creontiades* spp, *Distantiella theobroma, Dichelops furcatus, Dysdercus* spp., *Edessa* spp, *Euchistus* spp., *Eurydema pulchrum, Eurygaster* spp., *Halyomorpha halys, Horcias nobilellus, Leptocorisa* spp., *Lygus* spp, *Margarodes* spp, *Murgantia histrionic, Neomegalotomus* spp, *Nesidiocoris tenuis, Nezara* spp., *Nysius simulans, Oebalus insularis, Piesma* spp., *Piezodorus* spp, *Rhodnius* spp., *Sahlbergella singularis, Scaptocoris castanea, Scotinophara* spp., *Thyanta* spp, *Triatoma* spp., and *Vatiga illudens*;

from the order homoptera, for example, *Acyrthosium pisum, Adalges* spp, *Agalliana ensigera, Agonoscena targionii, Aleurodicus* spp, *Aleurocanthus* spp, *Aleurolobus barodensis, Aleurothrixus floccosus, Aleyrodes brassicae, Amarasca biguttula, Amritodus atkinsoni, Aonidiella* spp., *Aonidiella auranti, Aphididae, Aphis* spp., *Aspidiotus* spp., *Aulacorthum solani, Bactericera cockerelli, Bemisia* spp, *Brachycaudus* spp, *Brevicoryne brassicae, Cacopsylla* spp, *Cavariella aegopodii* Scop., *Ceroplaster* spp., *Chrysomphalus aonidium, Chrysomphalus dictyospermi, Cicadella* spp, *Cofana spectra, Cryptomyzus* spp, *Cicadulina* spp, *Coccus hesperidum, Dalbulus maidis, Dialeurodes* spp, *Diaphorina citri, Diuraphis noxia, Dysaphis* spp, *Empoasca* spp., *Eriosoma larigerum, Erythroneura* spp., *Gascardia* spp., *Glycaspis brimblecombei, Hyadaphis pseudobrassicae, Hyalopterus* spp, *Hyperomyzus pallidus, Idioscopus clypealis, Jacobiasca lybica, Laodelphax* spp., *Lecanium corni, Lepidosaphes* spp., *Lopaphis erysimi, Lyogenys maidis, Macrosiphum* spp., *Mahanarva* spp, *Metcalfa pruinosa, Metopolophium dirhodum, Myndus crudus, Myzus* spp., *Neotoxoptera* sp, *Nephotettix* spp., *Nilaparvata* spp., *Nippolachnus pini* Mats, *Odonaspis ruthae, Oregma lanigera* Zehnter, *Parabemisia myricae, Paratrioza cockerelli, Parlatoria* spp., *Pemphigus* spp., *Peregrinus maidis, Perkinsiella* spp, *Phorodon humuli, Phylloxera* spp, *Planococcus* spp., *Pseudaulacaspis* spp., *Pseudococcus* spp., *Pseudatomoscelis seriatus, Psylla* spp., *Pulvinaria aethiopica, Quadraspidiotus* spp., *Quesada gigas, Recilia dorsalis, Rhopalosiphum* spp., *Saissetia* spp., *Scaphoideus* spp., *Schizaphis* spp., *Sitobion* spp., *Sogatella furcifera, Spissistilus festinus, Tarophagus Proserpina, Toxoptera* spp, *Trialeurodes* spp, *Tridiscus sporoboli, Trionymus* spp, *Trioza erytreae, Unaspis citri, Zygina flammigera,* and *Zyginidia scutellaris*;

from the order Hymenoptera, for example, *Acromyrmex, Arge* spp, *Atta* spp., *Cephus* spp., *Diprion* spp., *Diprionidae, Gilpinia polytoma, Hoplocampa* spp., *Lasius* spp., *Monomorium pharaonis, Neodiprion* spp., *Pogonomyrmex* spp., *Solenopsis invicta, Solenopsis* spp. and *Vespa* spp.;

from the order Isoptera, for example, *Coptotermes* spp, *Corniternes cumulans, Incisitermes* spp, *Macrotermes* spp, *Mastotermes* spp, *Microtermes* spp, *Reticulitermes* spp.; *Solenopsis geminate*;

from the order Lepidoptera, for example, *Acleris* spp., *Adoxophyes* spp., *Aegeria* spp., *Agrotis* spp., *Alabama argillaceae, Amylois* spp., *Anticarsia gemmatalis, Archips* spp., *Argyresthia* spp, *Argyrotaenia* spp., *Autographa* spp., *Bucculatrix thurberiella, Busseola fusca, Cadra cautella, Carposina nipponensis, Chilo* spp., *Choristoneura* spp., *Chrysoteuchia topiaria, Clysia ambiguella, Cnaphalocrocis* spp., *Cnephasia* spp., *Cochylis* spp., *Coleophora* spp., *Colias lesbia, Cosmophila flava, Crambus* spp, *Crocidolomia binotalis, Cryptophlebia leucotreta, Cydalima perspectalis, Cydia* spp., *Diaphania perspectalis, Diatraea* spp., *Diparopsis castanea, Earias* spp., *Eldana saccharina, Ephestia* spp., *Epinotia* spp, *Estigmene acrea, Etiella zinckinella, Eucosma* spp., *Eupoecilia ambiguella, Euproctis* spp., *Euxoa* spp., *Feltia jaculiferia, Grapholita* spp., *Hedya nubiferana, Heliothis* spp., *Hellula undalis, Herpetogramma* spp, *Hyphantria cunea, Keiferia lycopersicella, Lasmopalpus lignosellus, Leucoptera scitella, Lithocollethis* spp., *Lobesia botrana, Loxostege bifidalis, Lymantria* spp., *Lyonetia* spp., *Malacosoma* spp., *Mamestra brassicae, Manduca sexta, Mythimna* spp, *Noctua* spp, *Operophtera* spp., *Orniodes indica, Ostrinia nubilalis, Pammene* spp., *Pandemis* spp., *Panolis flammea, Papaipema nebris, Pectinophora gossypiela, Perileucoptera coffeella, Pseudaletia unipuncta, Phthorimaea operculella, Pieris rapae, Pieris* spp., *Plutella xylostella, Prays* spp., *Pseudoplusia* spp, *Rachiplusia nu, Richia albicosta, Scirpophaga* spp., *Sesamia* spp., *Sparganothis* spp., *Spodoptera* spp., *Sylepta derogate, Synanthedon* spp., *Thaumetopoea* spp., *Tortrix* spp., *Trichoplusia ni, Tuta absoluta,* and *Yponomeuta* spp.;

from the order Mallophaga, for example, *Damalinea* spp. and *Trichodectes* spp.;

from the order Orthoptera, for example, *Blatta* spp., *Blattella* spp., *Gryllotalpa* spp., *Leucophaea maderae, Locusta* spp., *Neocurtilla hexadactyla, Periplaneta* spp., *Scapteriscus* spp, and *Schistocerca* spp.;

from the order Psocoptera, for example, *Liposcelis* spp.;

from the order Siphonaptera, for example, *Ceratophyllus* spp., *Ctenocephalides* spp. and *Xenopsylla cheopis*;

from the order Thysanoptera, for example, *Calliothrips phaseoli, Frankliniella* spp., *Heliothrips* spp, *Hercinothrips* spp., *Parthenothrips* spp, *Scirtothrips aurantii, Sericothrips variabilis, Taeniothrips* spp., *Thrips* spp; and/or from the order Thysanura, for example, *Lepisma saccharina*.

Examples of soil-inhabiting pests, which can damage a crop in the early stages of plant development and may be controlled with compositions of the present invention, may include:

from the order Lepidoptera, for example, *Acleris* spp., *Aegeria* spp., *Agrotis* spp., *Alabama argillaceae, Amylois* spp., *Autographa* spp., *Busseola fusca, Cadra cautella, Chilo* spp., *Crocidolomia binotalis, Diatraea* spp., *Diparopsis castanea, Elasmopalpus* spp., *Heliothis* spp., *Mamestra brassicae, Phthorimaea operculella, Plutella xylostella, Scirpophaga* spp., *Sesamia* spp., *Spodoptera* spp. and *Tortrix* spp.;

from the order Coleoptera, for example, *Agriotes* spp., *Anthonomus* spp., *Atomaria linearis, Chaetocnema tibialis, Conotrachelus* spp., *Cosmopolites* spp., *Curculio* spp., *Dermestes* spp., *Diabrotica* spp., *Dilopoderus* spp., *Epilachna* spp., *Eremnus* spp., *Heteronychus* spp., *Lissorhoptrus* spp., *Melolontha* spp., *Orycaephilus* spp., *Otiorhynchus* spp., *Phlyctinus* spp., *Popillia* spp., *Psylliodes* spp., *Rhizopertha* spp., *Scarabeidae, Sitotroga* spp., *Somaticus* spp., *Tanymecus* spp., *Tenebrio* spp., *Tribolium* spp., *Trogoderma* spp. and *Zabrus* spp.;

from the order Orthoptera, for example, *Gryllotalpa* spp.;

from the order Isoptera, for example, *Reticulitermes* spp.;

from the order Psocoptera, for example, *Liposcelis* spp.;

from the order Anoplura, for example, *Haematopinus* spp., *Linognathus* spp., *Pediculus* spp., *Pemphigus* spp. and *Phylloxera* spp.;

from the order Homoptera, for example, *Eriosoma larigerum;* from the order Hymenoptera, for example, *Acromyrmex, Atta* spp., *Cephus* spp., *Lasius* spp., *Monomorium pharaonis, Neodiprion* spp., *Solenopsis* spp. and *Vespa* spp.;

from the order Diptera, for example, *Tipula* spp.;

crucifer flea beetles (*Phyllotreta* spp.), root maggots (*Delia* spp.), cabbage seedpod weevil (*Ceutorhynchus* spp.) and aphids.

In some embodiments compositions of the present invention may provide advantages in controlling pests in the genus *Bactericera*. In particular embodiments of the present invention, the compositions of the present invention may include advantages in controlling *Bactericera cockerelli,* or the potato psyllid. In further embodiments of the present invention, the combinations may be useful in controlling pests of the genus *Thrips*. In particular embodiments, the compositions of the present invention may include advantages in controlling Thrips tabaci or onion thrips. In further embodiments of the present invention, the combination of active ingredients may include advantages in controlling *Listronotus maculicolis,* or the bluegrass weevil.

The methods and compositions of the present invention may provide advantages in controlling pests in one or more of the following species of plants: grape vines; cereals, such as wheat, barley, rye or oats; beet, such as sugar beet or fodder beet; fruits, such as pomes, stone fruits or soft fruits, for example apples, pears, plums, peaches, almonds, cherries, strawberries, raspberries or blackberries; leguminous plants, such as beans, lentils, peas or soybeans; oil plants, such as rape, mustard, poppy, olives, sunflowers, coconut, castor oil plants, cocoa beans or groundnuts; cucumber plants, such as marrows, cucumbers or melons; fibre plants, such as cotton, flax, hemp or jute; citrus fruit, such as oranges, lemons, grapefruit or mandarins; vegetables, such as spinach, lettuce, asparagus, cabbages, carrots, onions, tomatoes, potatoes, cucurbits or paprika; lauraceae, such as avocados, cinnamon or camphor; maize; tobacco; nuts; coffee; sugar cane; tea; vines; hops; durian; bananas; natural rubber plants; turf or ornamentals, such as flowers, shrubs, broad-leaved trees or evergreens, for example conifers. In particular embodiments, the compositions and methods of the present invention may be useful in turf grasses, including bluegrass and/or creeping bentgrass. This list does not represent any limitation In embodiments of the present invention, the ratio on a weight basis between the diamide insecticide and the avermectin in the compositions may be between 20:1 and 1:1, 18:1 and 1:1, 16:1 and 1:1, 14:1 and 1:1, 12:1 and 1:1, 10:1 and 1:1, 9:1 and 1:1, 8:1 and 1:1, 7:1 and 1:1, 6:1 and 1:1, 5:1 and 1:1, 4:1 and 1:1, 3:1 and 1:1, 2:1 and 1:1. Insome embodiments of the present invention, the ratio on a weight basis between the diamide insecticide and the avermectin may be between 10:1 and 2:1, or between 8:1 and 2:1, 6:1 and 2:1, or between 5:1 and 2:1. In some embodiments of the present invention, the ratio on a weight basis between the diamide insecticide and the avermectin may be between 8:1 and 4:1, or between 6:1 and 4:1.

Given the ratios provided above for the components, the application rate of the components may vary. For example, in some embodiments, the application rate of the composition of the two active components may be between about 50 grams of active components per hectare ("g ai/ha") and 500 g ai/ha. In further embodiments, the application rate of the combination of the active components may be between about 50 g ai/ha and 400 g ai/ha or between about 50 g ai/ha and about 300 g ai/ha or between about 50 g ai/ha and about 200 g ai/ha. In further embodiments, the application rate of the combination of the active components may be between about 50 g ai/ha and 150 g ai/ha or between about 100 g ai/ha and 150 g ai/ha.

In particular embodiments when controlling annual bluegrass weevil, a combination of cyantraniliprole and abamectin may be utilized. In such embodiments, the amount of application of cyantraniliprole may be between about 125 and about 200 g ai/ha, and between about 150 g ai/ha and about 200 g ai/ha, and about 175 g ai/ha. In addition in these embodiments, abamectin is applied between about 20 g ai/ha and 50 g ai/ha, and between about 25 g ai/ha and about 40 g ai/ha, and about 35 g ai/ha.

In addition, the compositions of the present invention may be applied to the target pest or to the plant any number of times during the growing process to properly control the pest. For example, the compositions of the present invention may be applied between one and eight times before harvest, or between one and seven times before harvest, or between one and five times before harvest, or between one and three times before harvest, or between one and two times before harvest. In addition, the compositions of the present invention may be applied one, two, three, four, five, six, seven, or eight times before harvest.

The compositions of the present invention may provide at least 10% more control over either of the active components alone against the same pests. In additional embodiments, the compositions of the present invention may provide at least 15%, 20%, 25%, 30%, 35%, 40%, 45%, 50%, 55%, 60%, 65%, 70%, 80%, 90%, 100%, 110%, 120%, 130%, 140%, 150%, 160%, 170%, 180%, 190%, 200%, or more control over either of the active components alone against the same pests.

Methods for applying or treating the active components on to plant propagation material, especially seeds, are known in the art, and include dressing, coating, pelleting and soaking application methods of the propagation material. Conventional treating techniques and machines can be used, such as fluidized beds, roller mills, rotostatic seed treaters, drum coaters, and spouted beds. The term "plant propagation material" is understood to denote generative parts of a plant, such as seeds, which can be used for the multiplication of the latter, and vegetative material, such as cuttings or tubers, for example potatoes. There may be mentioned for example seeds (in the strict sense), roots, fruits, tubers, bulbs, rhizomes and parts of plants. Germinated plants and young plants which are to be transplanted after germination or after emergence from the soil, may also be mentioned. These young plants may be protected before transplantation by a total or partial treatment by immersion Methods of applying to the soil can be via any suitable method, which ensures that the composition penetrates the soil, for example, nursery tray application, in furrow application, soil drenching, soil injection, drip irrigation, application through sprinklers or central pivot, incorporation into soil (broad cast or in band) are such methods. Alternatively or in addition one or more materials may be applied on a suitable substrate, for example a seed which is not intended for germination, and "sowing" the treated substrate with the plant propagation material.

Depending on the intended aims and the prevailing circumstances, the composition within the scope of the technology, are generally formulated as emulsifiable concentrates, suspension concentrates, directly sprayable or dilutable solutions, spreadable pastes, dilute emulsions, wettable powders, soluble powders, dispersible powders, dusts, granules or encapsulations in polymeric substances which comprise a nitroimino- or nitroguanidino-compound.

The active components are employed in these compositions together with at least one of the auxiliaries conventionally used in art of formulation, such as extenders, for example solvents or solid carriers, or such as surface-active compounds (surfactants). Formulation auxiliaries which are used are, for example, solid carriers, solvents, stabilizers, "slow release" auxiliaries, colourants and, if appropriate, surface-active substances (surfactants). Suitable carriers and auxiliaries are all those substances which are conventionally used for crop protection products. Suitable auxiliaries such as solvents, solid carriers, surface-active compounds, non-ionic surfactants, cationic surfactants, anionic surfactants and other auxiliaries in the compositions employed according to the invention are, for example, those which have been described in EP-A-736 252.

The action of the compositions within the scope of the technology which comprise insecticidal compounds may be extended substantially and adapted to prevailing circumstances by adding other insecticidally, acaricidally and/or fungicidally active ingredients. Suitable examples of added active ingredients include: neonicitinoid compounds such as thiamethoxam, imidacloprid, clothianidin, thiacloprid or acetamiprid; beta-cyfluthrin, cyantraniliprole, diafenthiuron, diazinon, emamectin, emamectin benzoate, fenoxycarb, fipronil, flonicamid, lambda-cyhalothrin, methiocarb, pymetrozine, pyriproxyfen, pyrifluquinazon, spinetoram, spinosad, spirotetramat, tefluthrin, thiodicarb or Ti-435. As an example, formulated compositions for applying to the soil generally comprise 0.1 to 99%, in particular 0.1 to 95%, of the active compounds and 1 to 99.9%, in particular 5 to 99.9%, of at least one solid or liquid auxiliary, it being possible, for 0 to 25%, in particular 0.1 to 20%, of the compositions to be surfactants (% in each case meaning percent by weight). While concentrated compositions are more preferred as commercial products, the end user will, as a rule, use dilute compositions which have considerably lower concentrations of active ingredient.

Formulated compositions may also comprise other solid or liquid auxiliaries, such as stabilisers, for example epoxidized or unepoxidized vegetable oils (for example epoxidized coconut oil, rapeseed oil or soya bean oil), antifoams, for example silicone oil, preservatives, viscosity regulators, binders and/or tackifiers, and also fertilizers or other active ingredients for achieving specific effects, for example, bactericides, fungicides, nematicides, molluscicides or herbicides.

Compositions may be produced in a known manner, for example prior to mixing with the auxiliary/auxiliaries by grinding, screening and/or compressing the active ingredient, for example to give a particular particle size, and by intimately mixing and/or grinding the active ingredient with the auxiliary/auxiliaries.

EXAMPLE

The potato psyllid study illustrates the advantages in controlling certain pests utilizing the methods and compositions of the present invention. In particular, a study was done to test the active components alone and in combination with one another, as provided as part of the present invention. In Treatments 2, 3 and 4, the potato seeds for the study were seed-treated with commercial CruiserMaxx Potatoes, which is a combination of the active ingredients thiamethoxam and fludioxonil. The rate of seed treatment for each of Treatments 2, 3, and 4 is 5.2 grams total active ingredient per 100 kilograms of seed. In addition, in Treatment 3, foliar applications were made with the commercially available Exirel 100 SE (active ingredient, cyantraniliprole) at 91 days after planting, 100 days after planting and 110 days after planting. In treatment 4, foliar applications were made with the commercially available Agrimek 0.70 SC (active ingredient, abamectin) at 91 days after planting, 100 days after planting and 110 days after planting. In Treatment 2, foliar applications were made with a composition of the present invention that included both cyantraniliprole and abamectin at a ratio of about 6:1 by weight of the active ingredients, at 91 days after planting, 100 days after planting and 110 days after planting. The results of the testing are presented in the tables below.

| Treatment | Foliar Application | Application Rate for Foliar Application | Mean Potato Psyllid Count per 20 leaves 91 DAP | Mean Potato Psyllid Count per 20 leaves 100 DAP | Mean Potato Psyllid Count per 20 leaves 110 DAP |
|---|---|---|---|---|---|
| 1 (Untreated Check) | N/A | N/A | 7.5 | 14.5 | 46.0 |
| 2 | Cyantraniliprole and Abamectin | 119.0 g ai/ha | 2.8 | 4.3 | 5.8 |
| 3 | Exirel 100 SE | 99.0 g ai/ha | 5.0 | 5.3 | 23.3 |
| 4 | Agrimek 0.70 SC | 21.0 g ai/ha | 1.8 | 4.0 | 36.8 |

As demonstrated in the present example, compositions of the present invention provide advantages in controlling target pests over the components alone.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. It is further noted that, as used in this specification, the singular forms "a," "an," and "the" include plural referents unless expressly and unequivocally limited.

The invention claimed is:

1. A method comprising: applying at least three times to a potato plant via foliar application, over an about 20-day period, about 100 g ai/ha to 150 g ai/ha of a composition comprising cyantraniliprole and abamectin in a weight ratio of between about 6:1 and 2:1, wherein the potato treated potato plants were planted at least about 91 days prior to foliar treatment, wherein the potato seeds seed-treated prior to planting with a composition comprising thiamethoxam and fludioxonil prior to planting, wherein the application of both compositions provides a destruction rate of at least 50% of potato psyllid as compared to untreated potato plants 20 days after applying and greater long-term control against potato psyllid where greater long-term control is defined as controlling more potato psyllid based on average potato psyllid count per leaf than either cyantraniliprole or abamectin alone 20 days after application of the respective active compounds.

2. The method of claim 1, wherein the ratio of cyantraniliprole and abamectin about 6:1 based on a weight of the components.

3. The method of claim 1, further comprising diluting the composition comprising cyantraniliprole and abamectin prior to application.

4. The method of claim 1, wherein cyantraniliprole is applied at about 102 g/ha and abamectin is applied at about 17 g/ha.

* * * * *